Dec. 24, 1957 J. VIAL 2,817,418
MECHANISMS FOR LOCKING A ROTATING PIECE WITH
RESPECT TO A CYLINDRICAL PIVOT
Filed May 29, 1953 7 Sheets-Sheet 1

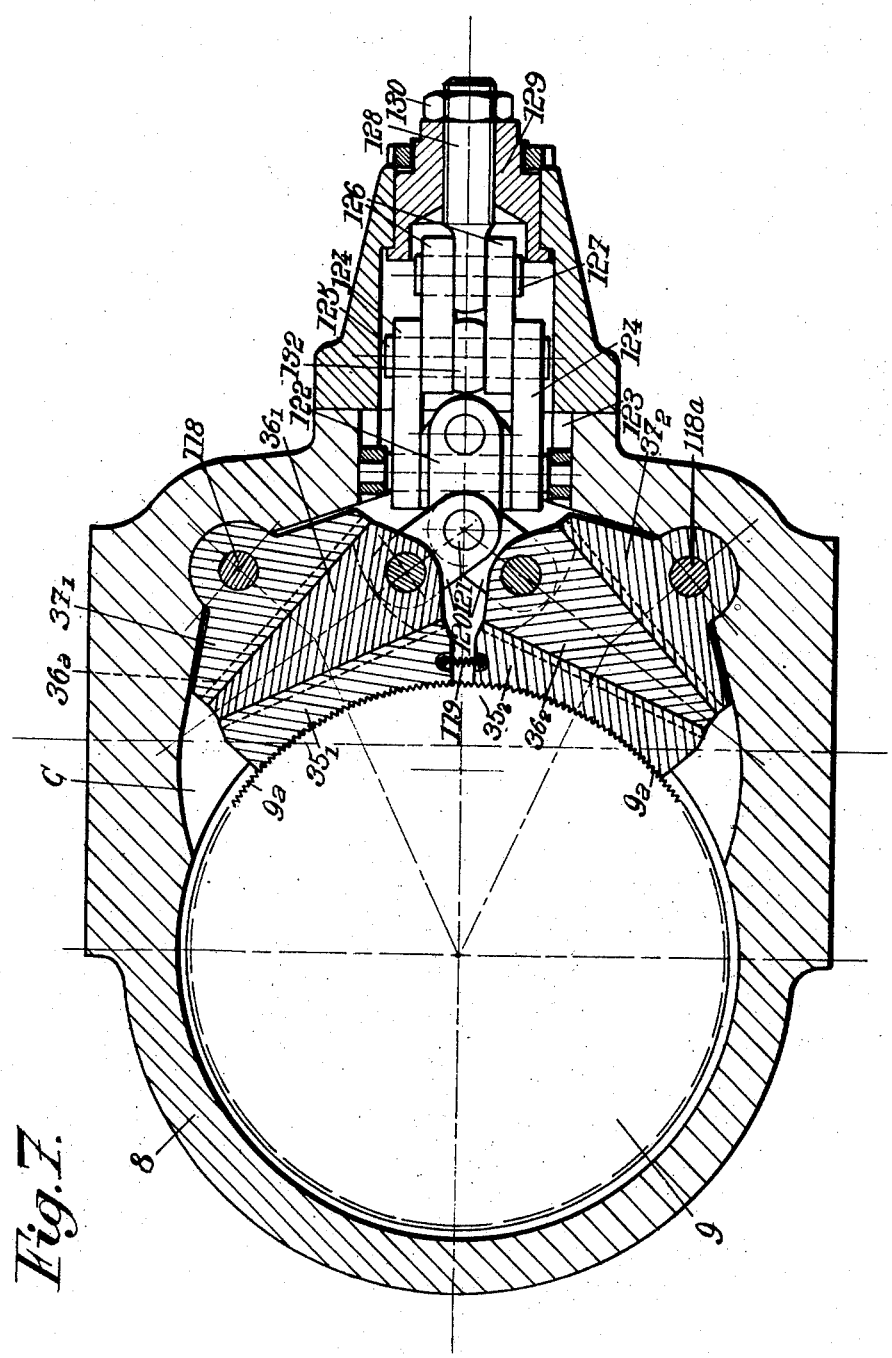

United States Patent Office

2,817,418
Patented Dec. 24, 1957

2,817,418

MECHANISMS FOR LOCKING A ROTATING PIECE WITH RESPECT TO A CYLINDRICAL PIVOT

Joseph Vial, Paris, France

Application May 29, 1953, Serial No. 358,418

Claims priority, application France June 3, 1952

6 Claims. (Cl. 188—69)

The present invention relates to machines including a cylindrical pivot and a piece surrounding said pivot, these two elements being adapted to rotate relatively to each other about the axis of said pivot.

The object of my invention is to provide a machine of this kind in which said two elements can be locked with respect to each other, so as to prevent relative rotation thereof, by means of a mechanism which is strong, reliable and easy to bring into and out of action.

For this purpose, according to my invention, the cylindrical wall of the pivot element is provided with teeth parallel to its axis and capable of cooperating with similar teeth carried by a locking member movable in the surrounding piece radially with respect to said axis, said locking member, which is resiliently urged away from said pivot, being adapted to be pushed toward it, for locking engagement of said teeth, by wedging means slidable, with respect to said pivot element, between said locking member and a bearing member mounted in said surrounding piece oscillatively about an axis parallel to said first mentioned axis.

Other features of my invention will become apparent in the course of the following detailed description of some specific embodiments thereof, with reference to the appended drawing, given merely by way of example, and in which:

Fig. 7 is a view similar to Figs. 3 and 4 and relating to still another modification.

Figure 1:
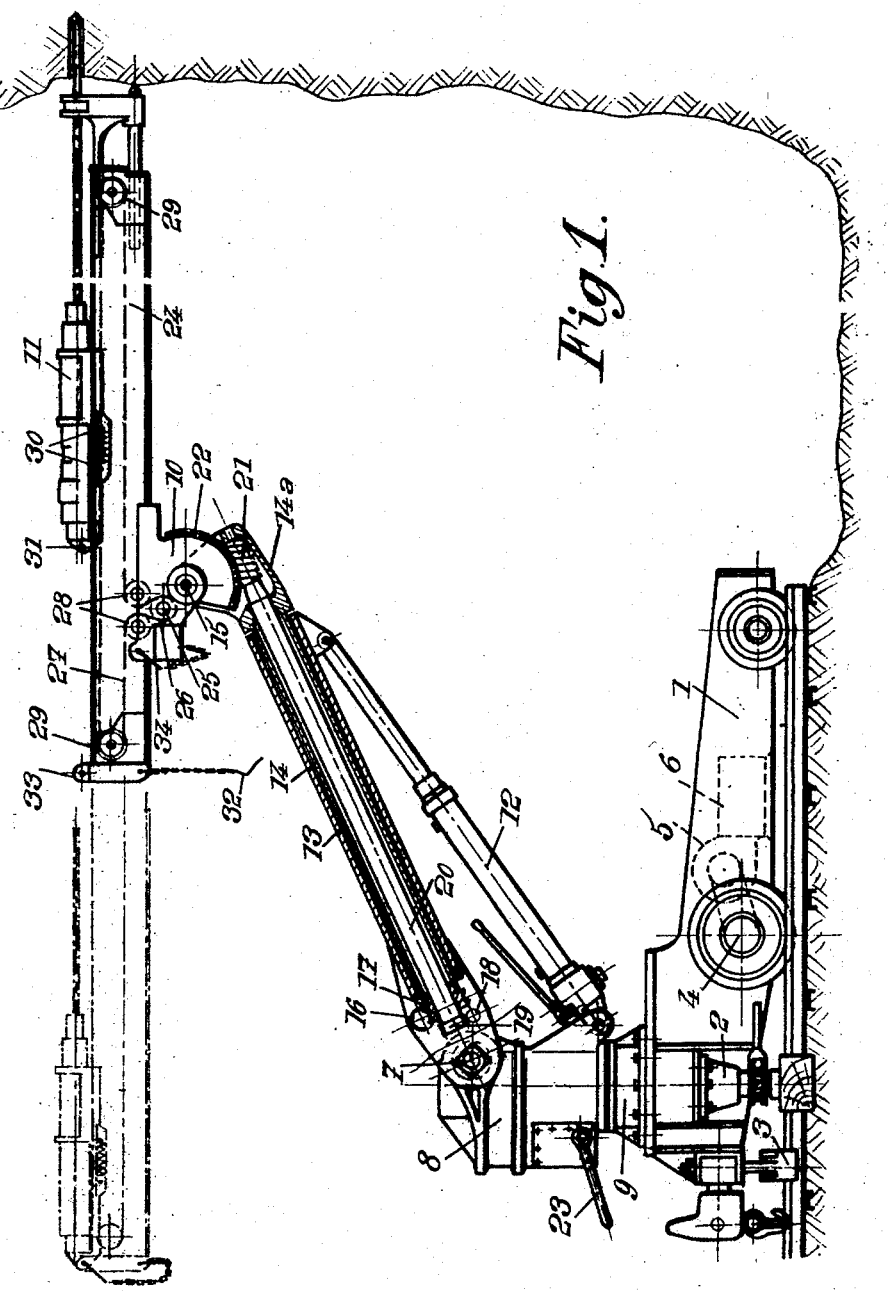
Fig. 1 is a general side view, with portions in section, of a machine according to my invention.
Figure 2:
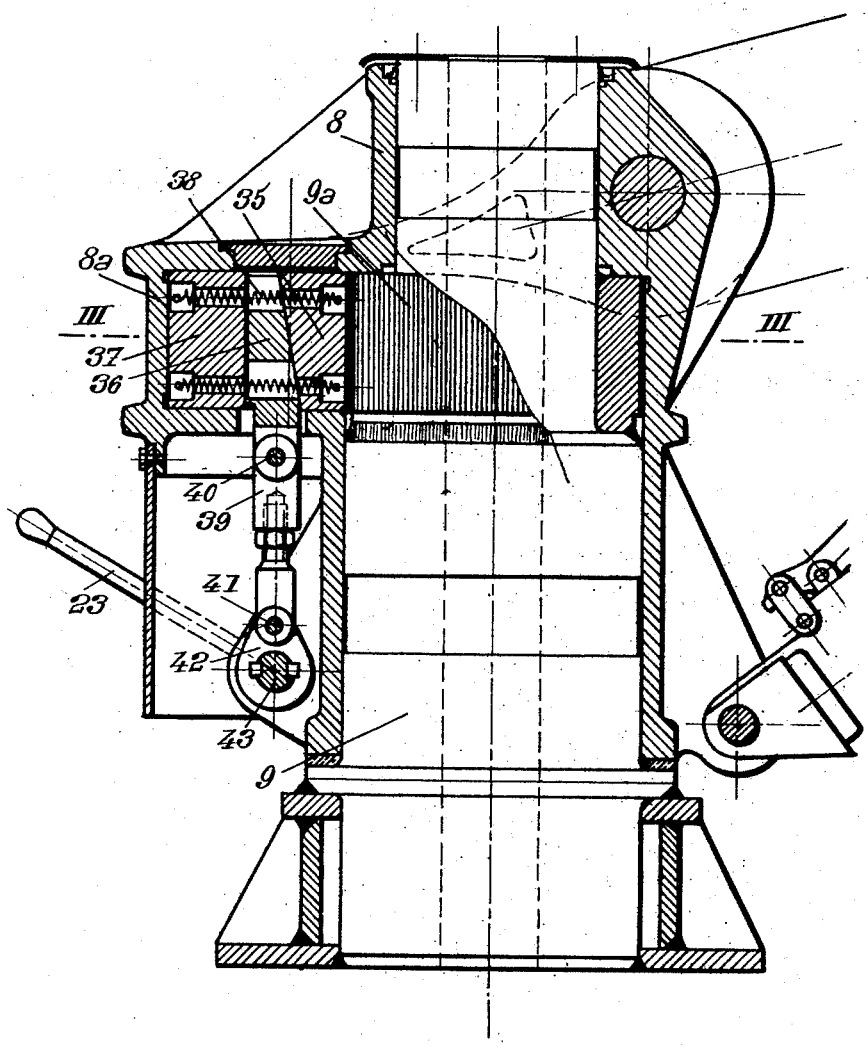
Fig. 2 is a vertical axial section of the portion of said machine with which my invention is concerned.
Figure 3:
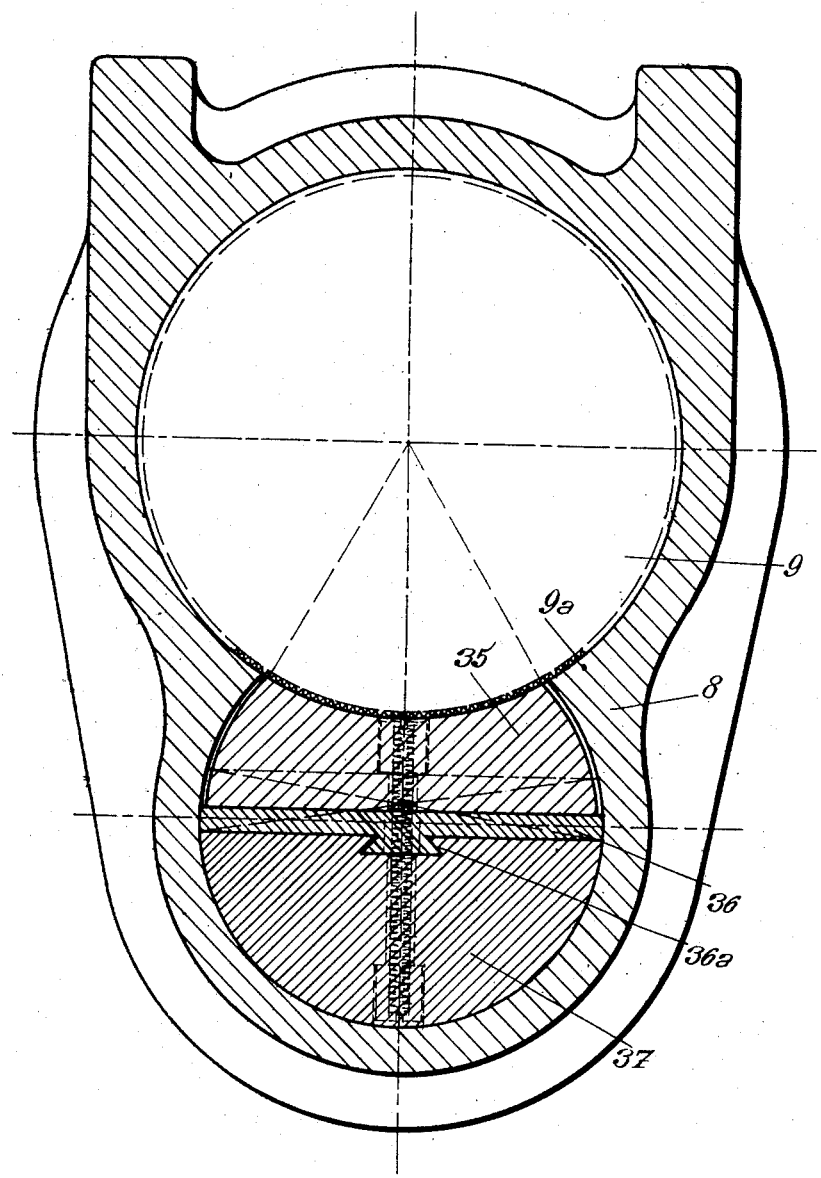
Fig. 3 is a cross-sectional view on an enlarged scale on the line III—III of Fig. 2.
Figure 4:
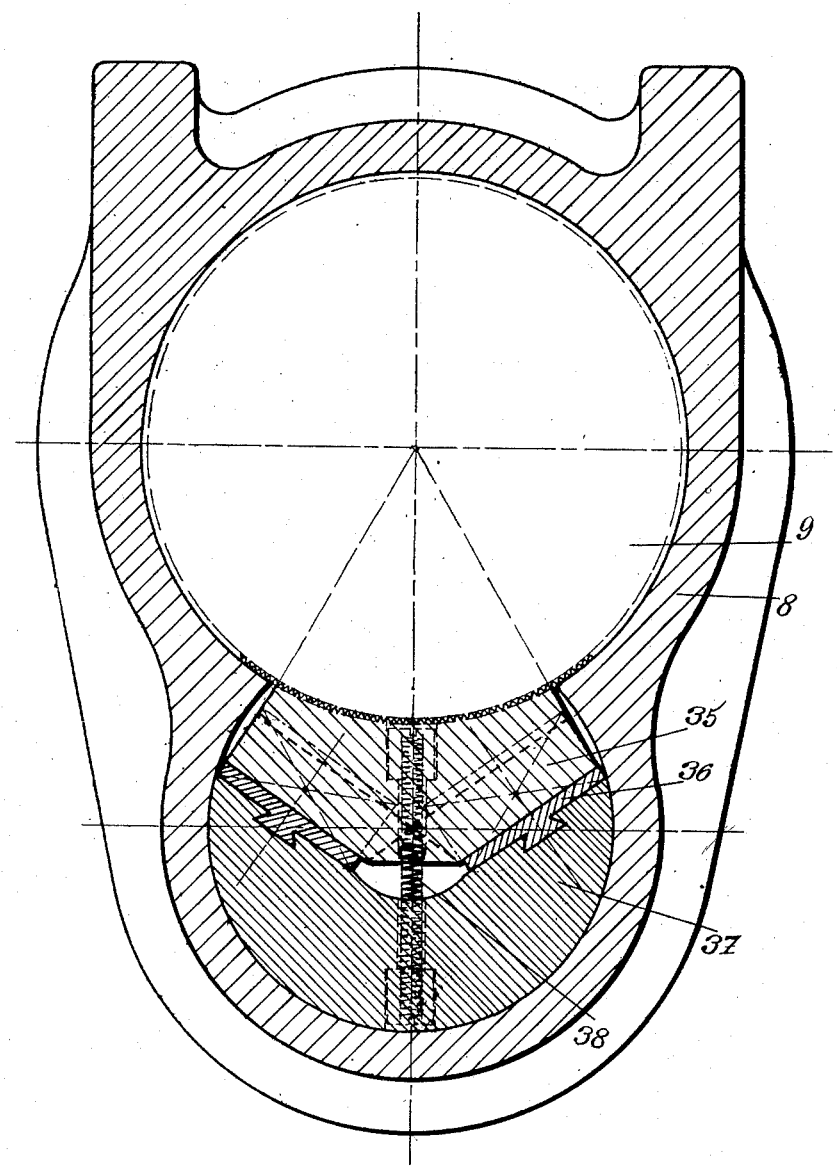
Fig. 4 is a view similar to Fig. 3, but showing a modification.

In the construction diagrammatically shown by Fig. 1, the frame of the machine includes a carriage 1 advantageously provided with stabilizing means, such for instance as supporting jacks 2 and rail-pinching devices 3. Advantageously, said carriage includes a power axle 4 driven through a speed-reducing gear 5, by a motor 6.

The machine shown by Fig. 1 includes a jib 13—14 of adjustable inclination pivoted about a horizontal axis 7 carried by a sleeve 8 rotatable about the vertical cylindrical pivot 9, and said jib carries a support 10 on which the drilling tool 11 is mounted.

The inclination of the jib may be adjusted by means of a hydraulic jack 12.

Locking of sleeve 8 with respect to pivot 9 is achieved, according to my invention, by a mechanism as illustrated by Figs. 2 to 6.

This locking mechanism includes a locking member 35 carried by sleeve 8 and provided with teeth adapted to mesh with corresponding teeth 9a carried by pivot 9.

At least one vertically slidable wedge 36 is adapted, when moved upwardly, to push member 35 against pivot 9. For instance, wedge 36 is guided (dovetail 36a) by a bearing piece 37 oscillative about a vertical axis to take up the play between the teeth.

On the other hand, return means, such, for instance, as pulling springs 38, are interposed between bearing piece 37 and locking member 35 so as to pull back member 35 and therefore permit sleeve 8 and pivot 9 to move relative to each other, when wedge 36 is withdrawn by means of the control device which will now be described.

When there is a single wedge 36 (which is the case in the construction of Figs. 2 and 3), this control device advantageously includes a connecting rod 39, preferably of adjustable length, interposed between two spindles 40 and 41 respectively carried by wedge 36 and by a crank pin 42 fixed on a shaft 43 operable by means of locking lever 23, the length of said connecting rod being so determined that the wedging position of part 36 corresponds substantially to the upper dead center position of crank pin 42.

When there are several wedges 36 (which is the case in the constructions of Figs. 4 to 6), said wedges, at least at the end of their wedging movement, must be controlled independently so that all of them can finally be brought into maximum wedging position.

I will consider, by way of example, the case where there are two wedges 36 between member 35 and the oscillative bearing piece 37.

Figure 5:
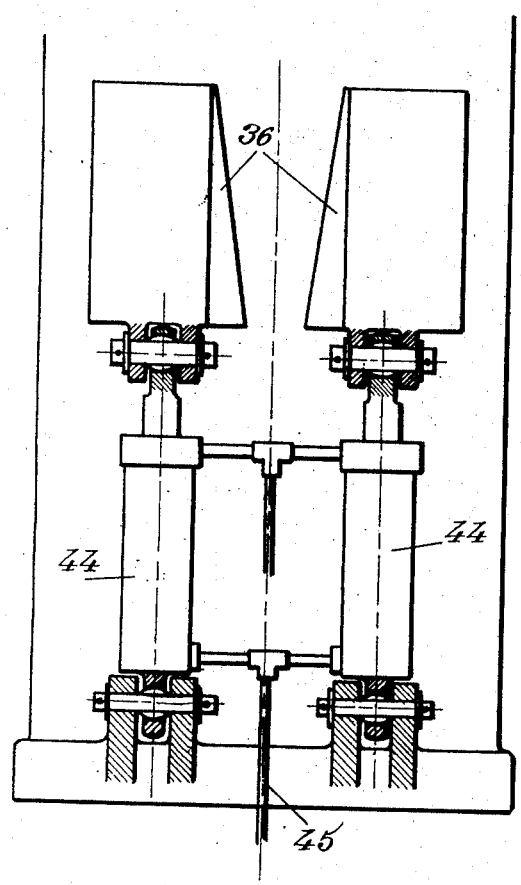
Fig. 5 is an elevational view of some parts of the mechanism shown by Fig. 4.

In the construction of Fig. 5, each of these two wedges 36 is actuated by a hydraulic jack 44, these two jacks being fed in parallel from the same conduit 45. In this case, when one of the wedges comes into maximum wedging position before the other one, the jack corresponding to the last mentioned wedge keeps working until the wedge it actuates in turn reaches its maximum wedging position.

Figure 6:
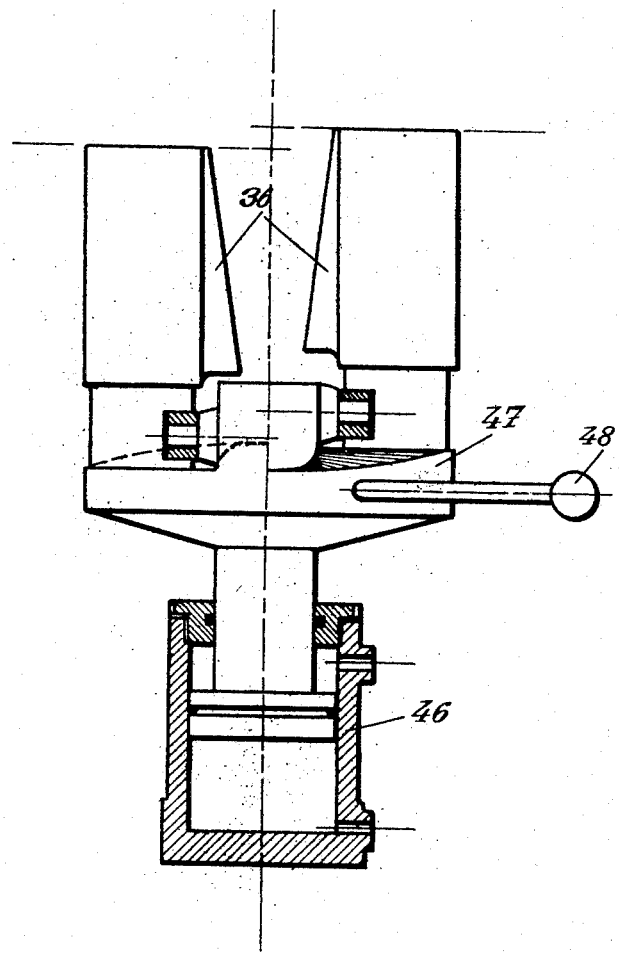
Fig. 6 shows, similarly to Fig. 5, a modification of said parts.

In the construction illustrated by Fig. 6, both wedges 36 are actuated by a single hydraulic jack 46 and an equalizer bar transmission is interposed to obtain a differential operation of said wedges at the ends of their strokes, such a transmission including, for instance, a disk forming a cam with a helical surface 47, operable by means of a lever 48.

Such a locking system makes it possible, in all cases, to obtain an efficient blocking of sleeve 8, whatever be the relative position of the teeth carried respectively by pivot 9 and member 35.

In the modification of Fig. 7, wedges $36_1$ and $36_2$, which apply locking members $35_1$ and $35_2$ against pivot 9, instead of sliding in a direction parallel to the pivot axis, are slidably guided in directions at right angles to said axis.

Wedges $36_1$—$36_2$ are engaged between locking members $35_1$—$35_2$ and bearing pieces $37_1$—$37_2$ respectively. Said bearing pieces are oscillative in cylindrical housings of part 8 about axes 118, 118a.

Wedges $36_1$—$36_2$ are controlled by links 120 pivoted about a pivot 121 carried by a piece 122 slidable radially, with respect to pivot 9, in slideways 123. To piece 122 are pivoted links 124 hinged, about an axis 125, to links 126 themselves pivoted, about an axis 127, to a fixed piece 128, adjustable in a part 129 fitted with a lock nut 130.

Links 124—126 form a toggle system controlled by control means (not visible on the drawing) moving pivot axis 125 in a vertical direction, i. e. one at right angles to the plane of Fig. 7.

A spring 119 urges members 35₁—35₂ toward each other.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A machine which comprises, in combination, a cylindrical pivot, a piece rotating about the axis of said pivot, the cylindrical wall of said pivot being provided with teeth parallel to said axis, a locking member movable in said rotating piece radially with respect to said axis, said member having a cylindrical wall provided with teeth adapted to mesh with said first mentioned teeth, a bearing piece mounted oscillatively in said rotating piece about an axis parallel to said first mentioned axis, means interposed between said bearing piece and said locking member and slidable with respect to said pivot for wedging said locking piece against said pivot, means for operating said wedging means, and resilient means for urging said locking member away from said pivot when said wedging means is retracted from wedging position.

2. A machine which comprises, in combination, a cylindrical pivot, a piece rotating about the axis of said pivot, the cylindrical wall of said pivot being provided with teeth parallel to said axis, a locking member movable in said rotating piece radially with respect ot said axis, said member having a cylindrical wall provided with teeth adapted to mesh with said first mentioned teeth, a bearing piece mounted oscillatively in said rotating piece about an axis parallel to said first mentioned axis, means interposed between said bearing piece and said locking member and slidable in a direction parallel to said axis with respect to said pivot for wedging said locking piece against said pivot, means for operating said wedging means, and resilient means for urging said locking member away from said pivot when said wedging means are retracted from wedging position.

3. A machine according to claim 2 in which said wedging means include a single wedge and the means for operating said wedging means are of the toggle type.

4. A machine according to claim 2 in which said wedging means include at least two wedges and the means for operating said wedging means are differentially operative to force both of said wedges into full wedging position.

5. A machine which comprises, in combination, a cylindrical pivot, a piece rotating about the axis of said pivot, the cylindrical wall of said pivot being provided with teeth parallel to said axis, two locking members movable in said rotating piece toward and away from said axis, said members having cylindrical walls provided with teeth adapted to mesh with said first mentioned teeth, two bearing pieces located opposite said locking members respectively and mounted oscillatively in said rotating piece about respective axes parallel to said first mentioned axis, wedges interposed between each locking member and the bearing piece located opposite said last mentioned locking member, said wedges being slidable in directions at right angles to said axis with respect to said pivot for wedging said locking pieces against said pivot, means for operating said wedging means, and resilient means for urging said locking members toward each other when said wedging means are retracted from wedging position.

6. A machine according to claim 5 in which said means for operating said wedges include links pivoted to said wedges about axes parallel to said first mentioned axis, a member slidable in said rotating piece in a radial direction with respect to said pivot, both of said links being pivoted to said slidable member, and means for controlling the radial displacement of said slidable member.

References Cited in the file of this patent

UNITED STATES PATENTS

| Number | Name | Date |
|---|---|---|
| 608,561 | Sauvage | Aug. 2, 1898 |
| 840,992 | Dickinson | Jan. 8, 1907 |
| 1,437,734 | Kessler | Dec. 5, 1922 |
| 1,472,751 | Goulet | Oct. 30, 1923 |
| 2,389,558 | Slater | Nov. 20, 1945 |
| 2,638,326 | Lehner | May 12, 1953 |

FOREIGN PATENTS

| Number | Country | Date |
|---|---|---|
| 818,485 | Germany | Oct. 25, 1951 |
| 756,241 | Germany | Nov. 9, 1953 |